(12) United States Patent
Acikel et al.

(10) Patent No.: US 7,734,963 B2
(45) Date of Patent: *Jun. 8, 2010

(54) NON-CAUSAL CHANNEL EQUALIZATION SYSTEM

(75) Inventors: Omer Fatih Acikel, San Diego, CA (US); Warm Shaw Yuan, San Diego, CA (US); Alan Michael Sorgi, Poway, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 891 days.

This patent is subject to a terminal disclaimer.

(21) Appl. No.: 11/589,466

(22) Filed: Oct. 30, 2006

(65) Prior Publication Data

US 2007/0061682 A1 Mar. 15, 2007

Related U.S. Application Data

(60) Division of application No. 10/317,439, filed on Dec. 12, 2002, now Pat. No. 7,149,938, and a continuation-in-part of application No. 10/020,426, filed on Dec. 7, 2001, now Pat. No. 7,024,599, and a continuation-in-part of application No. 10/077,332, filed on Feb. 15, 2002, now Pat. No. 6,915,464.

(51) Int. Cl.
*H03M 13/00* (2006.01)

(52) U.S. Cl. ........................ 714/709; 375/287

(58) Field of Classification Search ................. 714/709; 375/287

See application file for complete search history.

(56) References Cited

U.S. PATENT DOCUMENTS

| 5,612,974 | A | * | 3/1997 | Astrachan | 375/295 |
|---|---|---|---|---|---|
| 5,710,776 | A | * | 1/1998 | Tomlinson et al. | 714/704 |
| 5,841,484 | A | * | 11/1998 | Hulyalkar et al. | 348/607 |
| 6,266,633 | B1 | * | 7/2001 | Higgins et al. | 704/224 |
| 6,980,591 | B2 | * | 12/2005 | Pukkila et al. | 375/229 |
| 7,107,499 | B1 | * | 9/2006 | Acikel et al. | 714/708 |
| 2001/0017904 | A1 | * | 8/2001 | Pukkila et al. | 375/350 |

* cited by examiner

*Primary Examiner*—M. Mujtaba K Chaudry
(74) *Attorney, Agent, or Firm*—Law Office of Gerald Maliszewski; Gerald Maliszewski

(57) ABSTRACT

A system and method are provided for non-causal channel equalization in a communications system. The method comprises: establishing three thresholds; receiving a binary serial data stream; comparing the first bit estimate in the data stream to a second bit value received prior to the first bit; comparing the first bit estimate to a third bit value received subsequent to the first bit; data stream inputs below the first threshold and above the third threshold are a "0" if both the second and third bits are "1" values, and as a "1" if either of the second and third values is a "1"; data stream inputs above the second threshold and below the third threshold are a "1" if both the second and third bits are a "0" value, and as a "0" if either of the second and third values is a "0".

22 Claims, 9 Drawing Sheets

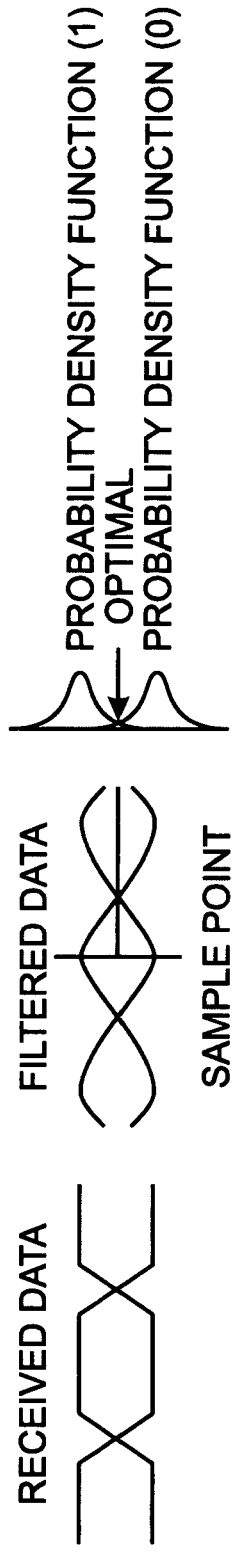
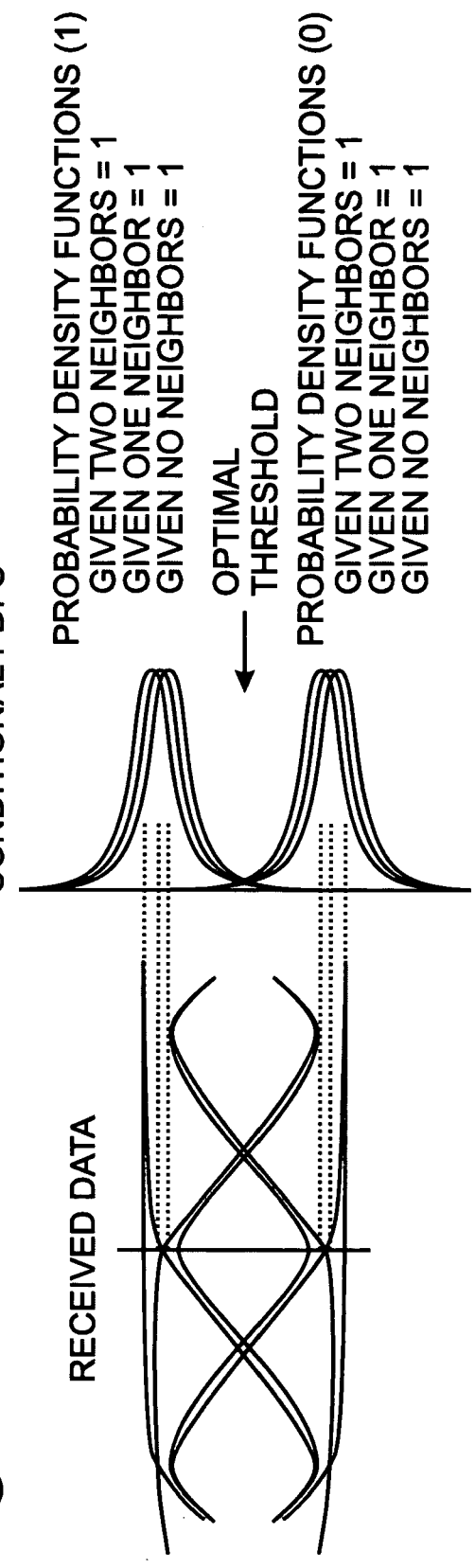

DATA STREAM INPUTS $V_1$ | DEFINITE "1"
---
"0" IF BOTH 2ND AND 3RD BIT VALUE DECISIONS ARE "1"
"1" IF ONLY ONE OF THE 2ND AND 3RD BIT VALUE DECISIONS IS A "1"
"1" IF BOTH 2ND AND 3RD BIT VALUES ARE "0"

$V_{OPT}$

"1" IF BOTH 2ND AND 3RD BIT VALUE DECISIONS ARE "0"
"0" IF ONLY ONE OF THE 2ND AND 3RD BIT VALUE DECISIONS IS A "0"
"0" IF BOTH 2ND AND 3RD BIT VALUES ARE "1"

$V_0$ | DEFINITE "0"

Fig. 7B

| FIRST BIT ESTIMATE LINE 120a | 120b | 2ND BIT VALUE | 3RD BIT VALUE | 1ST BIT VALUE |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 1 |

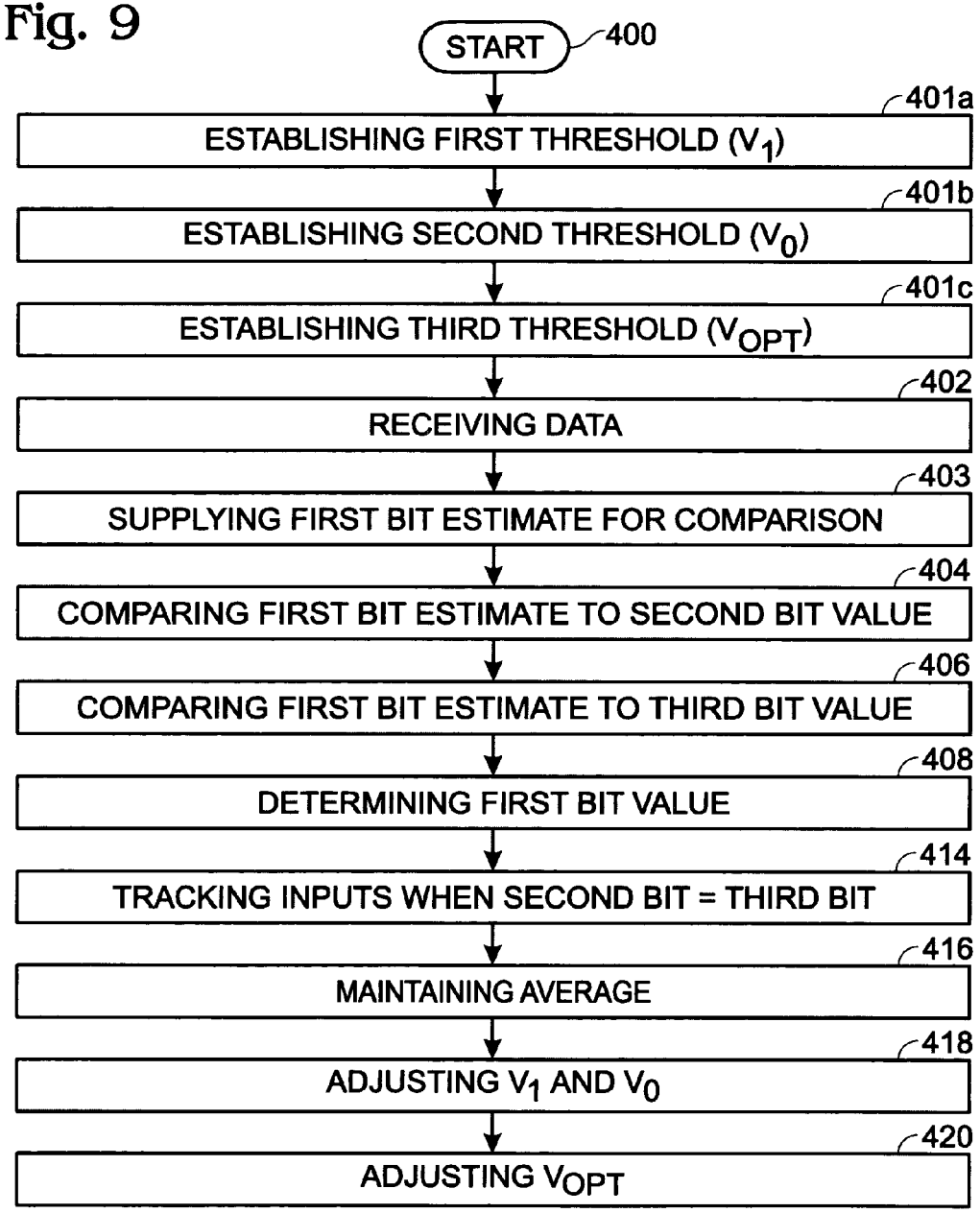

NON-CAUSAL CHANNEL EQUALIZATION SYSTEM

RELATED APPLICATIONS

This application is a Divisional of a application entitled, NON-CAUSAL CHANNEL EQUALIZATION, invented by Acikel et al., Ser. No. 10/317,439, filed Dec. 12, 2002 now U.S. Pat. No. 7,149,938.

This application is a continuation-in-part of a application entitled, SYSTEM AND METHOD FOR NON-CAUSAL CHANNEL EQUALIZATION, invented by Castagnozzi et al., Ser. No. 10/020,426, filed Dec. 7, 2001, now U.S. Pat. No. 7,024,599.

This application is a continuation-in-part of a application entitled, SYSTEM AND METHOD FOR NON-CAUSAL CHANNEL EQUALIZATION USING ERROR STATISTIC DRIVEN THRESHOLDS, invented by Castagnozzi et al., Ser. No. 10/077,332, filed Feb. 15, 2002 now U.S. Pat. No. 6,915,464.

BACKGROUND OF THE INVENTION

1. Field of the Invention

This invention generally relates to digital communications and, more particularly, to a system and method for minimizing the effects of inter-symbol interference in a data channel of binary coded information.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if inter-symbol interference caused by energy dispersion in a received data channel could be minimized.

It would be advantageous if the bit decision thresholds could be modified to take account of the dispersed energy in the neighboring bits in the data stream.

SUMMARY OF THE INVENTION

Many communication channels exhibit temporal spreading of the signaling waveform when propagating over long distances or over non-linear media. Similar temporal spreading can occur in the cabling between circuit boards, on a circuit board, or even within an integrated circuit due to improper impedance matching. This phenomenon is not effectively addressed by traditional linear equalization techniques due to the non-causal nature of the impairment. A method is presented to reduce the effects of pulse spreading on hard-decision error rate in communication systems affected by this problem. The method utilizes multiple decision thresholds for each data bit. Post-processing of the multiple decision data is employed to reduce the data to a single hard decision per bit. The multiple data thresholds are adjusted for optimal mitigation of the spreading effect.

The present invention approach to this problem is to perform multiple decisions on every bit with a threshold for each of the above-mentioned conditional probability density functions. The multiple decision data is stored for several bit times, to allow a calculation to be made on the succeeding bits. This calculation is then used to select the threshold most appropriate given the estimated neighbor values. The refined decision is output from the device and fed-forward to be used in processing of subsequent bits.

Accordingly, a method is provided for non-causal channel equalization in a communications system. The method comprises: establishing a first threshold ($V1$) to distinguish a high probability "1" first bit estimate; establishing a second threshold ($V0$) to distinguish a high probability "0" first bit estimate; establishing a third threshold ($Vopt$) to distinguish first bit estimates between the first and second thresholds; receiving one or more serial data stream inputs, such as non-return-to-zero (NRZ), return-to-zero (RTZ), and two-level quadrature amplitude modulation (4QAM). The data stream may be encoded with forward error correction (FEC). The method further comprises: comparing a first bit estimate to a second bit value received prior to the first bit; comparing the first bit estimate to a third bit value received subsequent to the first bit; in response to the comparisons, determining the value of the first bit.

Establishing a third threshold (Vopt) includes: distinguishing data stream inputs below the first threshold and above the third threshold as a "0" if both the second and third bits are "1" values, as a "1" if only one of the second and third bits is a "1" value, and as a "1" if both the second and third bit values are a "0"; and, distinguishing data stream inputs above the second threshold and below the third threshold as a "1" if both the second and third bits are a "0" value, as a "0" if only one of the second and third bits is a "0" value, and as a "0" is both the second and third bit values are a "1".

In one aspect the method further comprises: following the determination of the first bit values, FEC decoding the first bit values; and, using the FEC corrections of the first bit values to adjust the first, second, and third threshold values. Alternately, an averaging process is used to track and maintain the threshold values.

Additional details of the above-described method, and a non-causal channel equalization communication system are provided below.

BRIEF DESCRIPTION OF THE DRAWINGS

FIG. 1 is a diagram illustrating a signal recovered from a binary symmetric, non-dispersive channel in the presence of noise (prior art).

FIG. 2 is a diagram illustrating received waveforms that are distorted in response to the inter-symbol interference resulting from energy dispersion (prior art).

FIGS. 7a and 7b are a schematic block diagram, and associated truth table, of the non-causal circuit of FIGS. 3 and 6 in greater detail.

FIG. 9 is a flowchart illustrating an alternate embodiment of Step 412 of FIG. 8a.

DETAILED DESCRIPTION OF THE PREFERRED EMBODIMENTS

Figure 3:
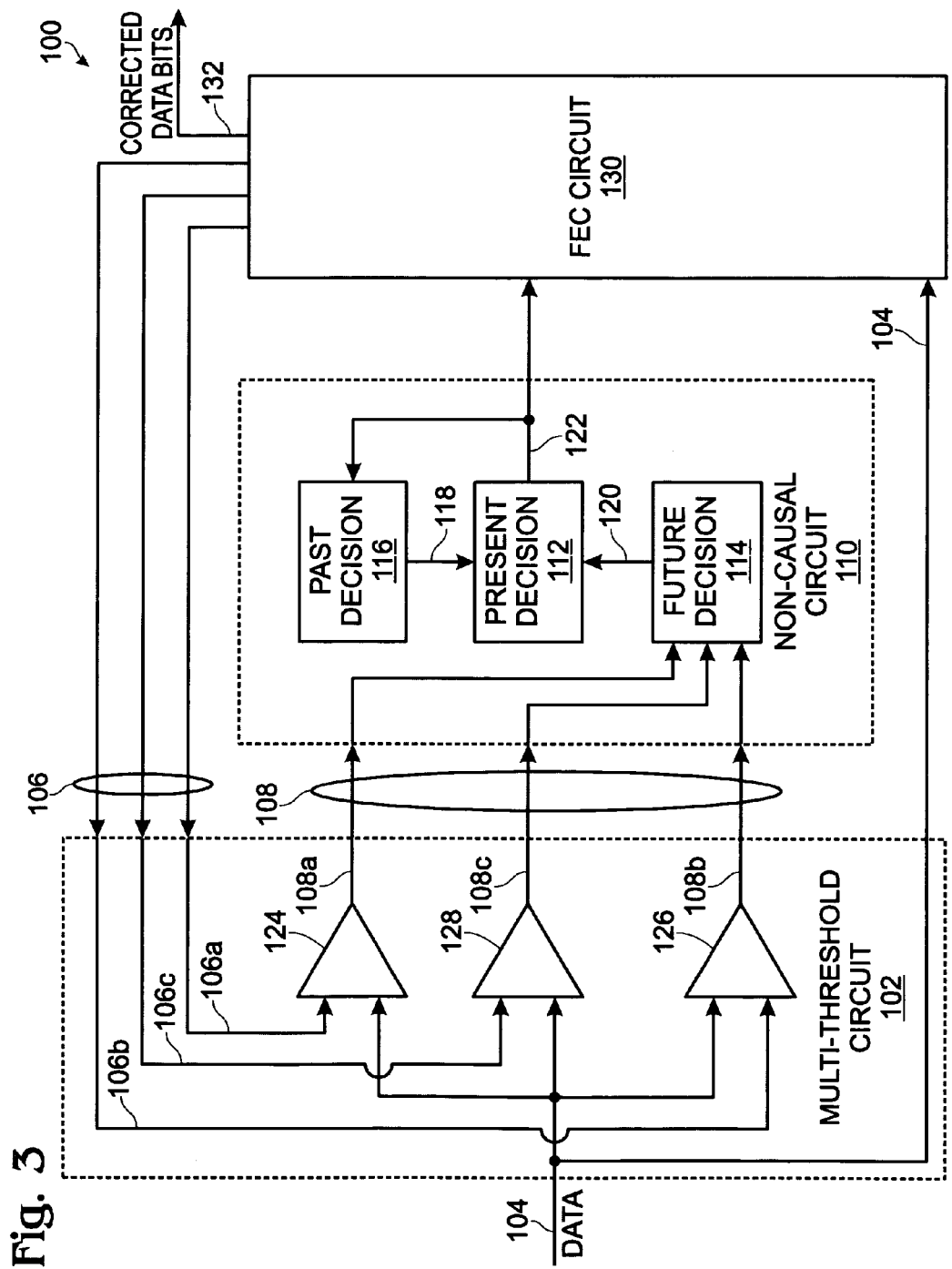
FIG. 3 is a schematic block diagram of the present invention non-causal channel equalization communication system.

FIG. 3 is a schematic block diagram of the present invention non-causal channel equalization communication system. The system 100 comprises a multi-threshold decision circuit 102 having an input on line 104 to accept a serial data stream, and an input on line 106 to accept threshold values. Although only a single input data stream is shown, it should be understood that the present invention system is also applicable to multi-channel systems where a plurality of serial data inputs are combined into a multi-level phase-shift keying or multi-level quadrature amplitude modulation format. With respect to any particular input data line, the multi-threshold decision circuit 102 may accept a data stream binary protocol such as NRZ or RTZ, for example. However, the present invention system is not necessarily limited to just these example protocols. Alternately, the present invention system is applicable to channel equalizing multiple lines of parallel data, such as a 32-bit data bus for example. It should be understood that the present invention system is applicable to any binary symmetric, or even asymmetric communication protocol. Further, the invention is application to binary communication protocols regardless of whether the clock is recovered from the data stream, or the clock is supplied as an independent signal.

The multi-threshold decision circuit 102 has outputs on line 108 to provide bit estimates responsive to a plurality of voltage threshold levels. A non-causal circuit 110 has inputs on line 108 to accept the bit estimates from the multi-threshold decision circuit 102. The non-causal circuit 110 compares a current bit estimate (a first bit) to bit values decisions made across a plurality of clock cycles. The non-causal circuit 110 has an output to supply a bit value decision for the current bit estimate determined in response to the non-causal bit value comparisons.

The non-causal circuit 110 includes a present decision circuit 112, a future decision circuit 114, and a past decision circuit 116. The future decision circuit has inputs connected to the mutli-threshold circuit outputs on line 108. The future decision circuit 114 has outputs to supply the first bit estimate and the third bit value (as explained below). The present decision circuit 112 has inputs to accept the first bit estimate, the third bit value, and a second bit value from the past decision circuit 116. The present decision circuit 112 compares the first bit estimate in the data stream to the second bit value received prior to the first bit estimate, represented as being supplied from the past decision circuit 116 on line 118. The present decision circuit 112 also compares the first bit estimate to the third bit value received subsequent to the first bit estimate, represented as being from the future decision circuit 114 on line 120. The present decision circuit 112 has an output on line 122 to supply a first bit value determined in response to comparing the first bit estimates to the second and third bit values.

Figures 4, 5:
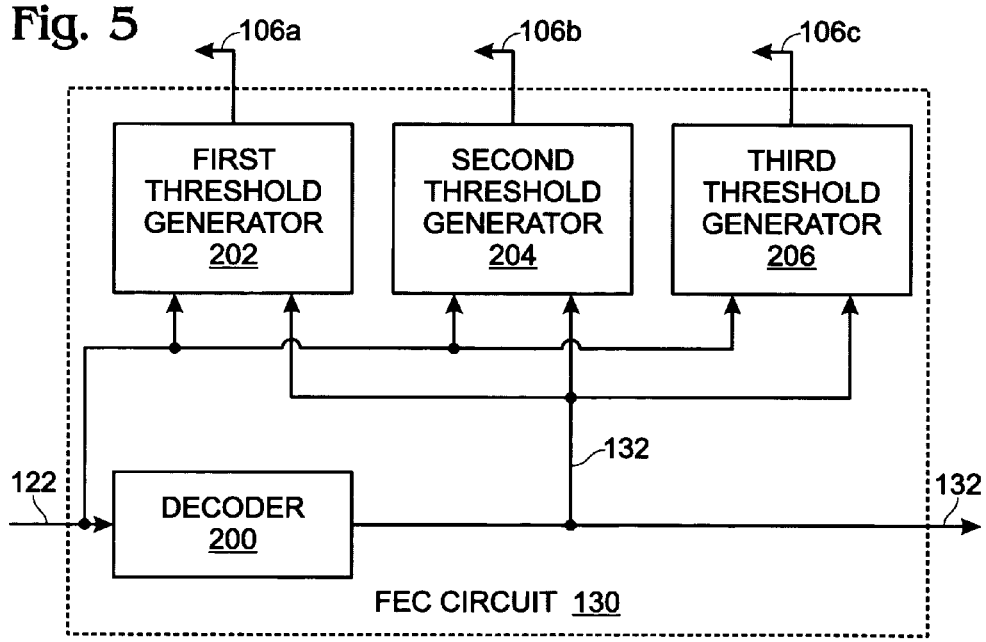
FIG. 4 is a graph illustrating the thresholds established by the multi-threshold circuit.
FIG. 5 is a schematic block diagram detailing the FEC circuit of FIG. 3.

FIG. 4 is a graph illustrating the thresholds established by the multi-threshold circuit. The following discussion should be considered in light of both FIGS. 3 and 4. The multi-threshold circuit 102 includes a first comparator 124 having an input to accept the input data stream on line 104, an input connected on line 106a to establish a first threshold (V1), and an output on line 108a to supply a signal distinguishing when the data stream input has a high probability of being a "1" bit value. A second comparator 126 has an input on line 104 to accept the data stream, an input on line 106b to establish a second threshold (V0), and an output on line 108b to supply a signal distinguishing when the data stream input has a high probability of being a "0" bit value. More literally, the second comparator 126 supplies a "0" when the data stream input on line 104 has a high probability of being a "0".

A third comparator 128 has an input on line 104 to accept the data stream, an input on line 106c to establish a third threshold (Vopt), and an output on line 108c to provide a signal when the data stream input has an approximately equal probability of being a "0" value as a "1" value. Distinguishing between a "1" and a "0" is a process that is performed by the non-causal circuit 110.

In some aspects of the system, the multi-threshold circuit 102 accepts a data stream encoded with forward error correction (FEC). Then, the system 100 further comprises a forward error correction (FEC) circuit 130 having an input on line 122 to receive the (first) bit values from the non-causal circuit 110. The FEC circuit 130 decodes the incoming data stream and corrects bit value in response to the decoding. The FEC circuit 130 has an output on line 106, specifically lines 106a, 106b, and 106c, to supply threshold values to the multi-threshold circuit 102 in response to the FEC corrections. The FEC circuit 130 has an output on line 132 to supply a stream of corrected data bits.

The multi-threshold circuit 102 and the non-causal circuit 110 work together to perform a non-causal analysis, regardless of whether the system incorporates the FEC circuit 130. When the multi-threshold circuit 102 receives a data stream input below the third threshold (Vopt) and above the second threshold (V0), the present decision circuit (of the non-causal circuit 110) responds by supplying a (first) bit value of "1" on line 122, if both the second and third bit values are "0" on lines 118 and line 120, respectively. Otherwise, the present decision circuit 112 supplies a bit value of "0", if only one of the second and third bit values is a "0", or if both the second and third bit values are a "1". When the multi-threshold circuit 102 receives a data stream input above the third threshold and below the first threshold, the present decision circuit 112 responds by supplying a bit value decision of "0" if both the second and third bit values are "1". The present decision circuit 112 supplies a bit value decision of "1" if only one of the second and third bits is a "1" value, or if both the second and third bit values are a "0".

FIG. 5 is a schematic block diagram detailing the FEC circuit 130 of FIG. 3. The FEC circuit 130 includes a decoder 200 having an input to accept the bit value on line 122 and an output to supply the stream of corrected data bits on line 132. The FEC circuit 130 also includes a first threshold generator 202 having an input on line 132 to accept the stream of corrected data bits. The first threshold generator 202 also has an input to accept the (first) bit values from the non-causal circuit on line 122. The first threshold generator 202 tracks the number of corrections in the first bit when the first bit value is determined to be a "0" and the second and third bits are both "1" values. That is, lines 122 and 132 are compared. Likewise, the first threshold generator 202 tracks the number of corrections in the first bit when the first bit is determined to be a "1" value and the second and third bits are both "1" values. The first threshold generator 202 has an output on line 106a to supply the first threshold (V1) in response to corrections tracked when the second and third bits are both "1" values.

The FEC circuit 130 also includes a second threshold generator 204 having an input on line 132 to accept the stream of corrected data bits. The second threshold generator 204 has an input to accept the bit values from the non-causal circuit on line 122. The second threshold generator 204 tracks the number of corrections in the first bit when the first bit is determined to be a "0" value and the second and third bits are both "0" values. The second threshold generator 204 tracks the number of corrections in the first bit when the first bit is determined to be a "1" value and the second and third bits are both "0" values. The second threshold generator 204 has an output on line 106b to supply the second threshold (V0) in response to corrections tracked when the second and third bits are both "0" values.

The FEC circuit 130 includes a third threshold generator 206 having an input on line 132 to accept the stream of corrected data bits. The third threshold generator 206 has an input on line 122 to accept bit values from the non-causal circuit. The third threshold generator 206 tracks the number of corrections in the first bit when the first bit is determined to be a "0" value and only one of the second and third bits is a "1" value. Alternately, corrections could be tracked of when the first bit is determined to be a "1" value and only one of the second and third bits is a "1" value. The third threshold generator 206 has an output on line 106c to supply the third threshold (Vopt) in response to corrections tracked in the first bit when one of the second or third bit values is a "1" value. The threshold generators 202-206 can supply an analog voltage on line 106, or a digital signal that is translated into an analog voltage at the multi-threshold circuit.

In another aspect of the system 100, the FEC circuit 130 third threshold generator 206 just tracks the number of corrections in the first bit when the first bit is determined to be a "1" value, without regard to the previous or subsequent bit values, and adjusts the third threshold (Vopt) in response to corrections tracked when the first bit is determined to be a "1" value. Alternately, third threshold generator 206 tracks the number of corrections in the first bit when the first bit is determined to be a "0" value, without regard to the previous or subsequent bit values, and adjusts the third threshold (Vopt) in response to corrections tracked when the first bit is determined to be a "0" value. That is, the Vopt threshold is generated without non-causal analysis.

In some aspects of the system, the first, second, and third threshold generators 202/204/206 have inputs to accept the first bit values from the non-causal circuit on line 122 and the stream of corrected data bits on line 132. The threshold generators 202/204/206 track statistics of the number of corrections in the first bit when the first bit is determined to be a "0" value and:
    the second and third bits are both "0" values;
    the second bit is a "1" value and the third bit is a "0" value;
    the second bit value is a "0" and the third bit is a "1" value; or,
    the second and third bits are both "1" values.

Likewise, the threshold generators 202/204/206 track statistics of the number of corrections in the first bit when the first bit is determined to be a "1" value and:
    the second and third bits are both "0" values;
    the second bit is a "1" value and the third bit is a "0" value;
    the second bit value is a "0" and the third bit is a "1" value; or,
    the second and third bits are both "1" values.

The eight patterns mentioned above correspond to the four probability density functions described in the Functional Description Section, below. The first, second, and third threshold generator 202/204/206 each have an output to supply the first threshold (V1), second threshold (V0), and third threshold (Vopt), respectively, on lines 106a, 106b, and 106c. The threshold outputs are supplied in response to combinations of correction statistics. Note that not every pattern, or correction statistic need be used in the calculation of a particular threshold. Further, each threshold may be calculated in response to a different group of statistics. In addition, the calculation of some thresholds may be an indirect result of statistical analysis. For example, V1 and V0 may be determined in response to statistical analysis, while Vopt is set midway between V1 and V0.

In other aspects of the system, additional statistics can be used to determine threshold. For example, the threshold generators 202/204/206 may additionally track statistics of the total number of first bit "0" value errors and the total number of first bit "1" value errors, and supply threshold outputs in response to the total number of "0" and "1" error statistics. Then, the thresholds can be set in reference to a combination of ten different correction statistics.

Figure 6:
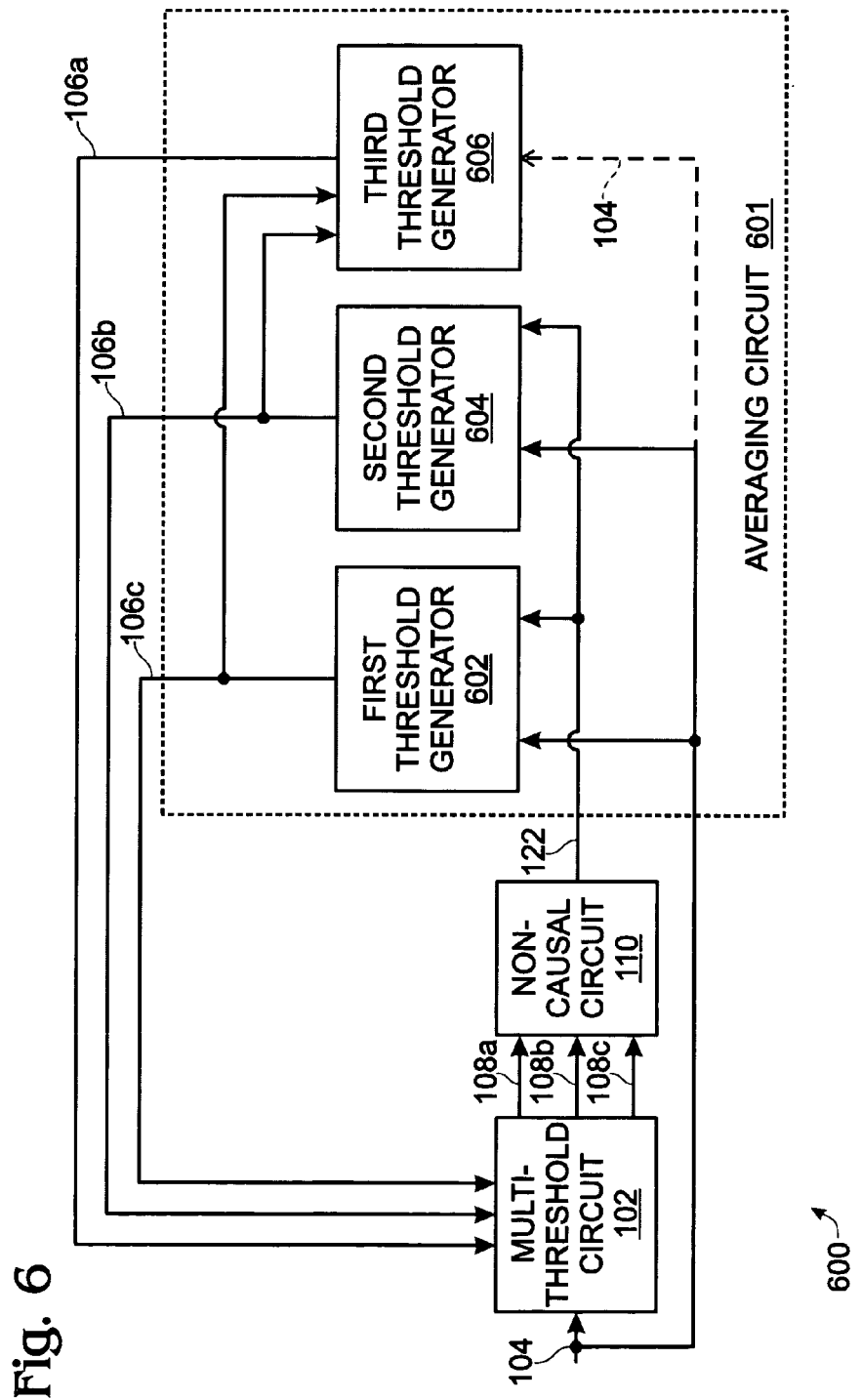
FIG. 6 is a schematic block diagram illustrating an alternate aspect of the system, where an averaging circuit is used instead of the FEC circuit.

FIG. 6 is a schematic block diagram illustrating an alternate aspect of the system, where an averaging circuit is used instead of the FEC circuit. The multi-threshold circuit 102 and the non-causal circuit 110 are the same as explained in the description of FIG. 3. In this aspect of the system 600, long-term averages are maintained to minimize processing in the determination of the threshold settings. An averaging circuit 601 is shown to "hold" the threshold generators described below. However, it should be understood that the threshold generators could alternately be included as part of the multi-threshold circuit 102 or the non-causal circuit 110. A first threshold generator 602 has an input to accept the output of the non-causal circuit (first bit value) on line 122. The first threshold generator 602 also has an input connected on line 104 to accept the data stream input. The first threshold generator 602 tracks the data stream inputs (in the clock period associated with the first bit) when the second and third bit values both equal "1" and maintains a long-term average of the tracked data stream input. That is, an average is maintained of the data stream voltage when the second and third bit values equal "1". The first threshold generator 602 supplies the first threshold (V1) responsive to the long-term average.

Likewise, a second threshold generator 604 has an input connected to the output of the non-causal circuit 110 on line 122 and an input to accept the data stream input on line 104. The second threshold generator 604 tracks the data stream inputs when the second and third bit values both equal "0" and maintains a long-term average of the data stream inputs. The average data stream voltage is kept when the second and third bits have a "0" value. The second threshold generator 604 supplies the second threshold (V0) on line 106b responsive to the long-term average.

In the long-term average scenario, processing is even further reduced with respect to a third threshold generator 606. The third threshold generator 606 has inputs on lines 106a and 106b to accept the first (V1) and second (V0) thresholds, respectively. The third threshold generator 606 has an output on line 106c to supply the third threshold (Vopt) responsive to the first and second thresholds. There are many different algorithms that can be used to select the third threshold value. In one aspect of the system 600, the third threshold generator 606 supplies the third threshold approximately midway between the first and second thresholds. This threshold can be further adjusted to account for asymmetrical noise distribution. Note that the present invention system 600 may incorporate FEC processing downstream from the non-causal circuit 110 (not shown). The threshold generators 602-606 can supply an analog voltage on line 106, or a digital signal that is translated into an analog voltage at the multi-threshold circuit.

In another aspect of the system 600, the third threshold generator accepts the data stream input, shown as a dotted line 104. The third threshold generator 606 maintains the average voltage, or a digital representation of the average voltage, on the data stream input. Note, this is a measurement of the data stream without regard to non-causal analysis, or the analysis of bit values. The third threshold generator 606 supplies the third threshold (Vopt) at an output on line 106c in response to the measured average. The third threshold can be set to the measured average, for example. Note in this aspect, the input lines 106a and 106b are not needed. With pseudorandom scrambling it assumed that the average voltage is a result of an equal number of "0" and "1" bits being received on line 104. This method of generating the third threshold is very effective when the noise distribution is symmetrical. It should be noted that the channel equalization of several parallel data lines will likely become more critical as data rates continue to increase, as FEC correction processor demands become more intensive.

As noted above, the multi-threshold decision circuit accepts a serial data stream protocol such as binary symmetric, binary asymmetric, non-return to zero (NRZ), or return-to zero (RTZ). It should be understood that if the present invention system 100 accepts multiple serial input data lines, for example two input lines, then the system would include separate subsystems for each line, where each subsystem would include a multi-threshold circuit, non-causal circuit, FEC circuit (if applicable), and/or averaging circuit (if applicable).

For simplicity, a single input line and a single associated subsystem have been shown and described. Alternately, in some aspects a single (sub)system can be multiplexed between input lines. If multiple input lines are received, then the system may include additional circuitry (not shown) to combine the two lines of input data (after channel equalization) and perform multi-level demodulation, or the combination of multiple bits into parallel bus words of information.

For example, the system may comprise a first plurality of multi-threshold decision circuits each accepting a serial data stream, and a first plurality of non-causal circuits, each having inputs to accept bit estimates from a corresponding multi-threshold decision circuit. In some aspects, the first plurality of multi-threshold circuits accept information modulated in a format such as a first-level phase-shift keying and a first-level quadrature amplitude modulation format. Note that the term "first-level" as used above, directly corresponds to the number of serial data input streams. For example, two multi-threshold circuits may accept information from two input data streams modulated in a two-level quadrature amplitude modulation (4QAM) format. In this example, "first" would be equal to the number "2". In another example, the present invention channel equalization system could accept 32 input data lines and, after equalization, decode the 32 first bit value (every clock period) as a parallel data or address bus.

More specifically, the system may comprise a first multi-threshold decision circuit having an input to accept a first serial data stream, an input to accept threshold values for the first serial data stream, and outputs to provide bit estimates responsive to a plurality of voltage threshold levels. A second multi-threshold decision circuit could be included having an input to accept a second serial data stream, an input to accept threshold values for the second serial data stream, and outputs to provide bit estimates responsive to a plurality of voltage threshold levels. Then, a first non-causal circuit would have inputs to accept bit estimates from the first multi-threshold decision circuit. As in the single data stream case, the first non-causal circuit compares a current first serial data stream bit estimate to bit value decisions made across a plurality of clock cycles. The first non-causal circuit would have an output to supply a bit value for the current bit estimate determined in response to the non-causal bit value comparisons. Likewise, a second non-causal circuit would have inputs to accept bit estimates from the second multi-threshold decision circuit.

Figure 7A:
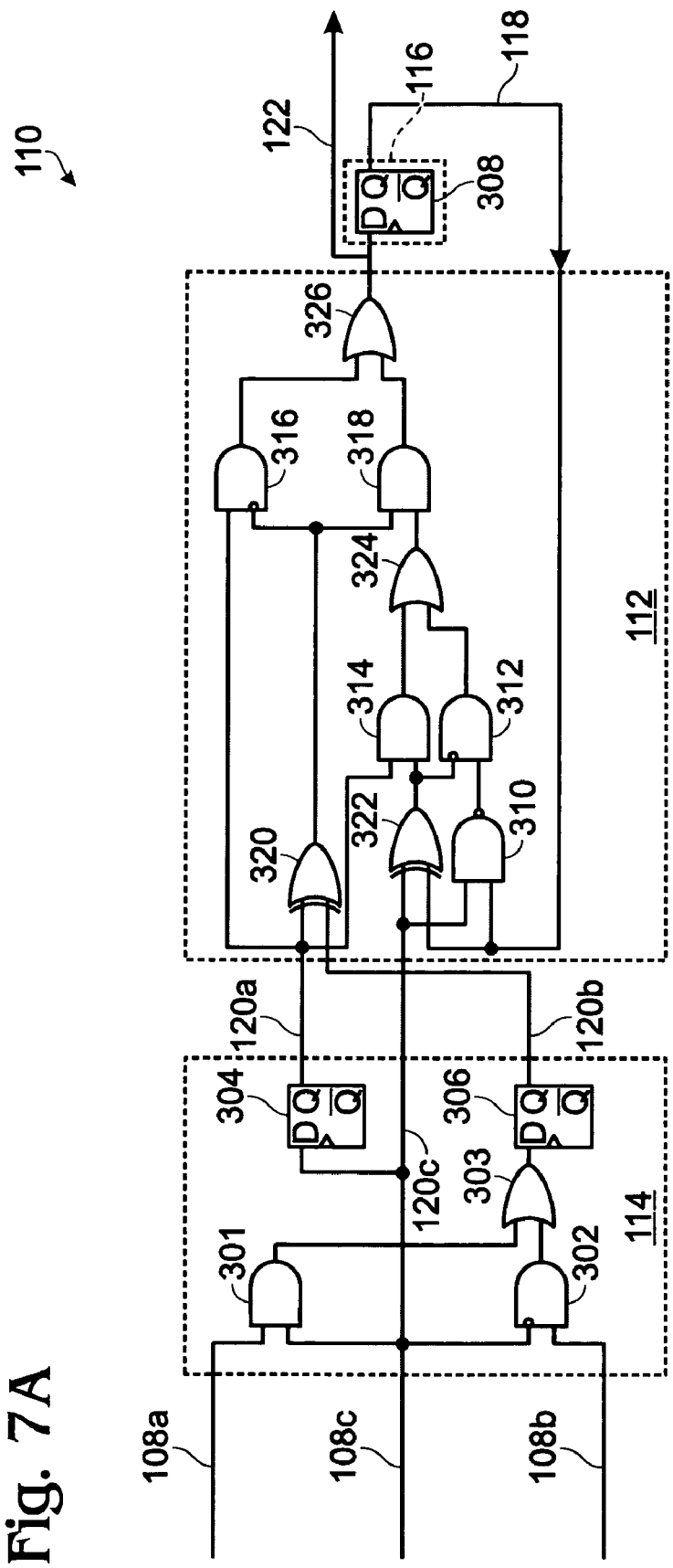

FIGS. 7a and 7b are a schematic block diagram, and associated truth table, of the non-causal circuit 110 of FIGS. 3 and 6 in greater detail. FIG. 7a represents only one of many designs that can be used to embody the invention. The future decision circuit 114 has inputs connected to the outputs of the first, second, and third comparators of the multi-threshold circuit on lines 108a, 108b, and 108c, respectively. These three lines correspond to the thresholds shown in FIG. 4. The future decision circuit 114 passes the third comparator signal through on line 120c. This signal is called the third bit value. The future decision circuit 114 performs AND and OR operations using AND circuit 301, AND circuit 302, and OR circuit 303. Delays of one clock cycle are added using flip-flops 304 and 306. When the data stream input is less than V0, the estimates on line 120a and 120b are "0,0", respectively. When the data stream input is between Vopt and V0, the estimates on lines 120a and 120b are "0,1", respectively. When the data stream input is between Vopt and V1, the estimates on lines 120a and 120b are "1,0", respectively. When the data stream input is above V1, the estimates are lines 120a and 120b are "1,1", respectively. The combination of lines 120a and 120b is called the first bit estimate.

The past decision circuit 116 delays the first bit value on line 122 one clock cycle to supply the second bit value on line 118. Again, a D flip-flop 308 is used for the delay.

The present decision circuit 112 has inputs connected to the future decision circuit outputs to accept the first bit estimate and third bit value on lines 120a, 120b, and 120c, respectively. The present decision circuit 112 supplies a first bit value by comparing the first bit estimate to situations when the second and third bit decision values are both "1", when the second and third bit value decisions are both "0", and when only one of the second and third bit value decisions is a "1". To accomplish these above-stated goals, AND circuits 310 through 318 are employed. Note that AND circuits 316 and 318 have one inverted input and that 310 has an inverted output (NAND). Also used are OR and XOR gates 320 through 326. Again, alternate circuit designs can accomplish the same functions. More important is the relationship between the signal inputs and signal outputs.

FIG. 7b is a truth table illustrating the operation of the present decision circuit 112 of FIG. 7a. The non-causal circuit 110 of the present invention systems 100 and 600 can be implemented using many different combinations of circuits. More critical is the actual task performed. This task is more clearly defined in light of the truth table diagram.

The first four lines in the table illustrate the case where the data input, at a clock period associated with a first bit, is below V0. The first bit value is made in comparison to the four different combinations of the second and third bit values. Likewise, the second four lines in the table illustrate the case where the data input, at a clock period associated with a first bit, is above V0 and below Vopt. The third set of four lines in the table illustrates the case where the data input is above Vopt, but below V1. The last set of four lines in the table illustrates the case where the data input is above V1.

Functional Description

Returning to FIGS. 3 and 6, in some aspects of the system 100/600, the input signal is buffered (not shown). The data signal is provided to the multiple threshold comparators 124 through 126. In some aspects of the system 100/600 circuits, not shown, a timing recovery circuit is used at the output of the comparators on lines 108a through 108c. The timing recovery circuit generates a clock and sample signal from the received data. The sample signal is synchronized to the center of the data bit. In this implementation, a method for offsetting the sample point is provided to compensate device or channel specific anomalies. Note, in other aspects a data clock is supplied as a signal independent of the data.

The non-causal circuit 110 is used as a high performance decision device prior to FEC decoding in the system 100. FEC decoding provides additional information on the validity of the estimates made by the non-causal circuit 110 as a by-product of the error correction procedure. This information can be processed and used to optimize the decision points of multi-threshold circuit 102. Error rate information on the relative probability of a ones ("1s") error vs. a zeros ("1s") error is collected for the four cases of the probability density function (PDF). Specifically:

PDF 1) P(errorred one|no neighboring 1s) P(errorred zero|no neighboring 1s)
PDF 2) P(errorred one|preceding neighbor 1) P(errorred zero|preceding neighbor 1)
PDF 3) P(errorred one|following neighbor 1) P(errorred zero|following neighbor 1)
PDF 4) P(errorred one|two neighboring 1s) P(errorred zero|two neighboring 1s)

Since most FEC encoded systems are typically scrambled to insure a 50% mark ratio, statistical data for each of the three cases can be reduced to a ratio. Each threshold can be adjusted to achieve the ones/zero ratio that provides the best fit for the channel in use. In many cases this will be ~50%. For cases in which dispersion is symmetric, PDF 2 and PDF 3 are combined to a single statistic.

In addition, statistics can be collected for the total number of corrected "0"s and the total number of corrected "1"s. Note that the statistics for the number of corrected "0"s and "1"s can be determined from an analysis of the above-mentioned eight patterns, called PDF1 through PDF4. These 10 statistics (the eight PDF patterns, plus the two total error sums) can be used to control the threshold levels. For example, V1 may be set in response to S(101)+S(111)−S(011), where S(101) represents the accumulated "0" errors when the neighboring (second and third) bit values are "1"s, where S(111) represents the accumulated "1" errors when the neighboring bit values are both "1"s, and where S(011) represents the accumulated "1" errors when the preceding bit value is a "0" and the subsequent bit value is a "1". Thus, any of the thresholds can be set in response to various combinations of the above-mentioned 10 statistics. The present invention is not limited to an analysis of any particular number or type of the above-mentioned statistics. Neither is the invention necessarily limited to the analysis of just these 10 statistics as other statistics, although perhaps more complicated and processor intensive, can be collected in response to selected bit value sequences.

Figure 8A:
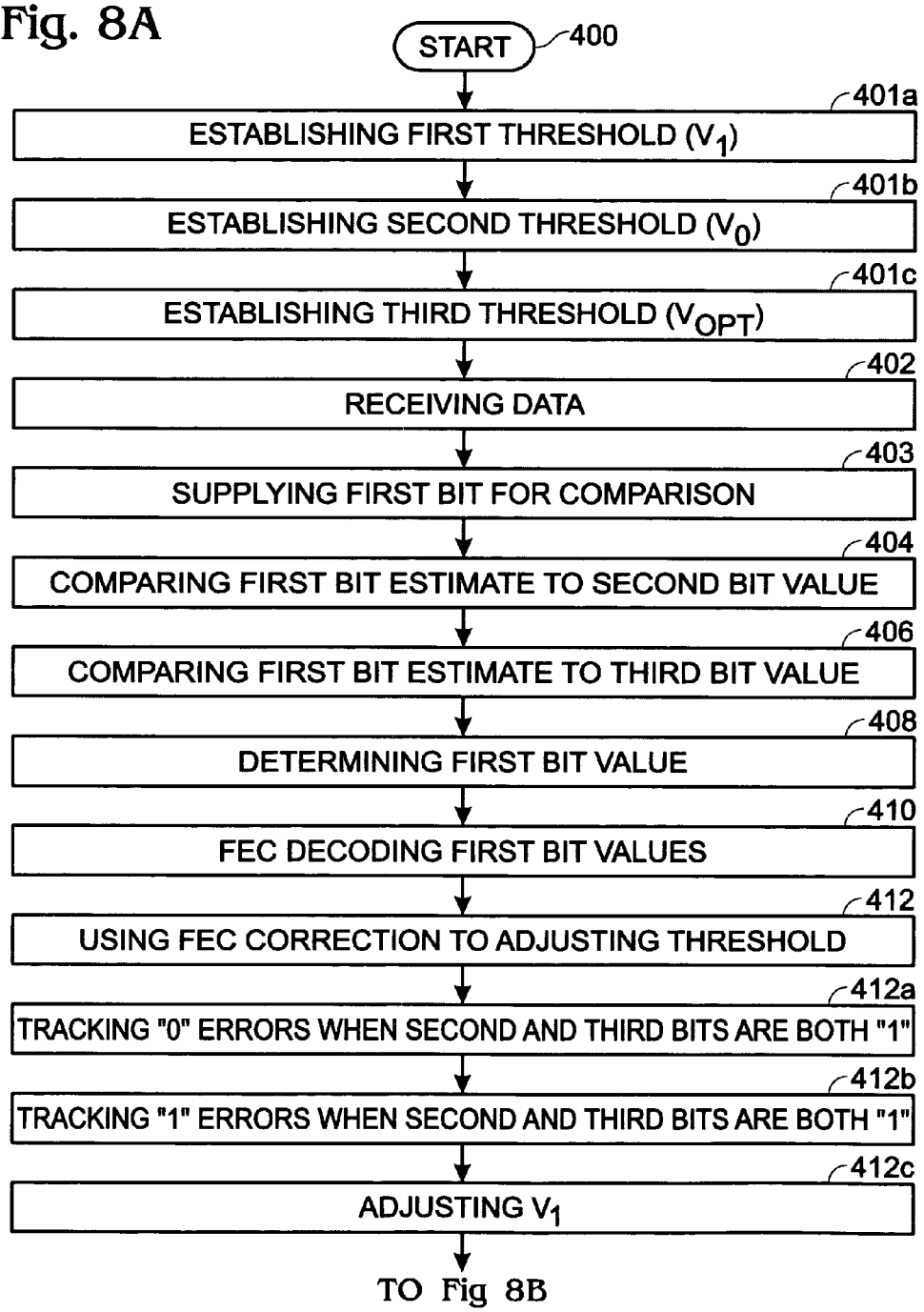
FIGS. 8a and 8b are flowcharts illustrating the present invention method for non-causal channel equalization in a communications system.
Figure 8B:
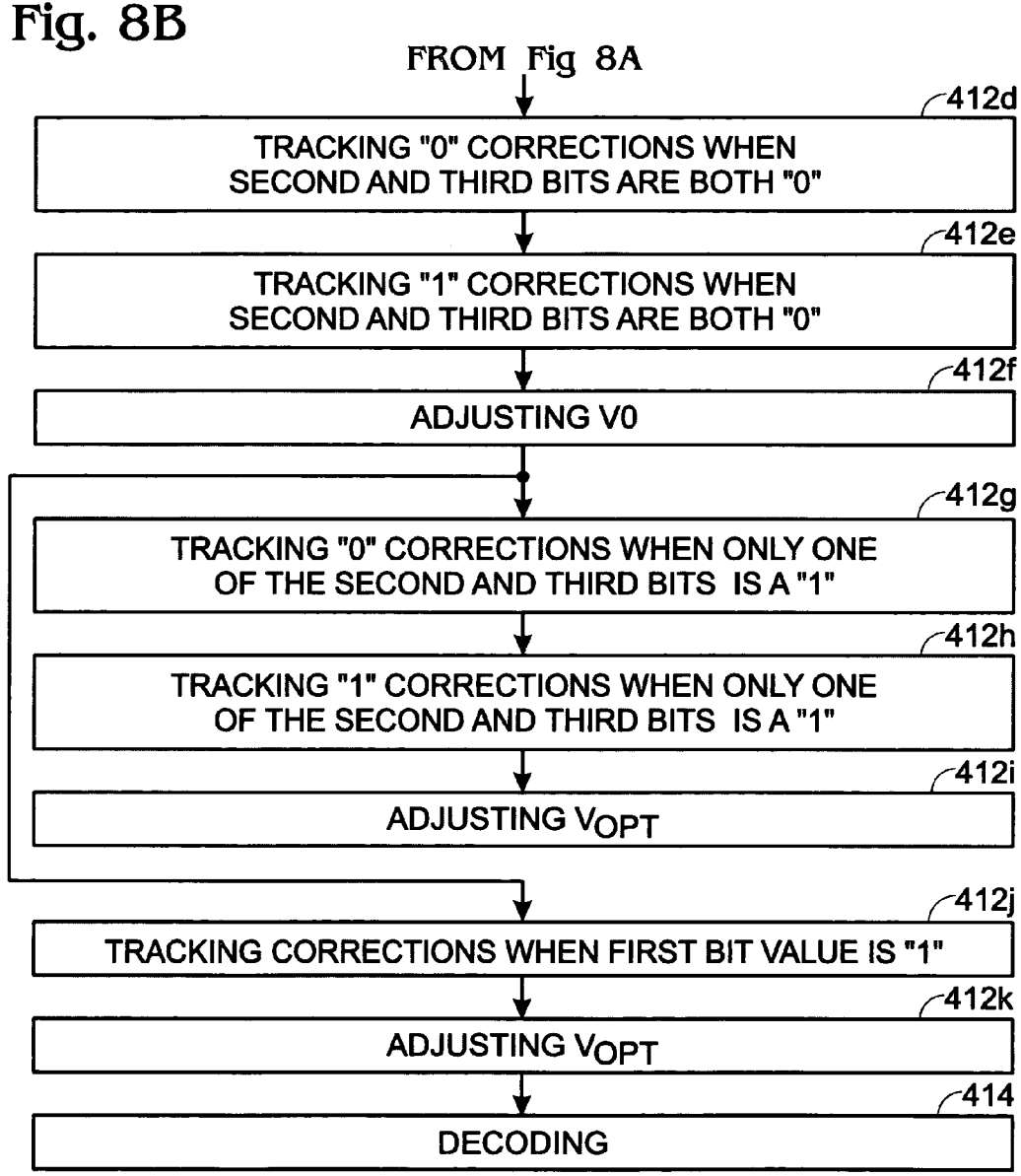

FIGS. 8a and 8b are flowcharts illustrating the present invention method for non-causal channel equalization in a communications system. This method generally corresponds to FIG. 3. Although the method (and the methods of FIG. 9, below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400. Step 401a establishes a first threshold (V1) to distinguish a high probability "1" first bit estimate. Step 401b establishes a second threshold (V0) to distinguish a high probability "0" first bit estimate. Step 401c establishes a third threshold (Vopt) for first bit estimates between the first and second thresholds. Step 402 receives a serial data stream input. As mentioned above, the serial data input is a binary symmetrical or asymmetric format, such as NRZ or RTZ. Further, the invention is application to binary communication protocols regardless of whether the clock is recovered from the data stream, or the clock is supplied as an independent signal. In other aspects, a plurality of serial data stream inputs are received in parallel. Thus, a first plurality of serial data stream inputs can be received with information modulated in a protocol such as first-level phase-shift keying or first-level quadrature amplitude modulation. Again, it should be understood that the "first" in the term "first-level" is equal to the value of the "first plurality". For example, two serial inputs may be used to receive a 4QAM (4PSK) modulated signal. In this example, the "first-level" is equal to two (two-level QAM). Alternately, a plurality of data streams can be decoded as a parallel data bus.

Step 403 supplies the first bit estimate for comparison in response to distinguishing the data stream input at the first, second, and third thresholds. Step 404 compares the first bit estimate in the data stream to a second bit value received prior to the first bit. Step 406 compares the first bit estimate to a third bit value received subsequent to the first bit. Step 408, in response to the comparisons, determines the value of the first bit.

In some aspects of the method, receiving a plurality of serial data stream inputs in Step 402 includes substeps (not shown). Step 402a receives a first serial data stream. Step 402b receives a second serial data stream having a predetermined phase relationship with the first data stream. Comparing a first bit estimate in the serial data stream to a second bit value received prior to the first bit in Step 404 includes substeps (not shown). Step 404a compares a first bit estimate in the first serial data stream to a second bit value received prior to the first bit. Step 404b compares a first bit estimate in the second serial data stream to a second bit value received prior to the first bit. Comparing the first bit estimate to a third bit value received subsequent to the first bit in Step 406 includes substeps (not shown). Step 406a compares the first bit estimate to a third bit value received subsequent to the first bit in the first serial data stream. Step 406b compares the first bit estimate to a third bit value received subsequent to the first bit in the second serial data stream. Then, determining the value of the first bit in response to the comparisons includes substeps (not shown). Step 408a determines the value of the first bit in the first data stream. Step 408b determines the value of the first bit in the second data stream.

In some aspects of the method a further step, Step 414, following the determination of the first plurality of first bit values, decodes the combination of the first plurality of determined first bit values. For example, Step 414, following the determination of the first bit values, decodes the combination of the first bit value from the first serial data stream and the first bit value from the second serial data stream.

In some aspects of the method, establishing a third threshold (Vopt) to distinguish first bit estimates between the first and second thresholds in Step 401c includes substeps. Step 401c1 (not shown) distinguishes data stream inputs below the first threshold and above the third threshold as a "0" if both the second and third bits are "1" values, as a "1" if only one of the second and third values is a "1" value, and as a "1" if both the second and third bits are a "0" value. Step 401c2 (not shown) distinguishes the data stream inputs above the second threshold and below the third threshold as a "1" if both the second and third bits are a "0" value, as a "0" if only one of the second and third values is a "0" value, and as a "0" if both the second and third bits are a "1" value.

In some aspects, receiving a data stream in Step 402 includes receiving a data stream encoded with forward error correction (FEC). Then, the method comprises further steps. Step 410, following the determination of the first bit values, FEC decodes the first bit values. Step 412 uses the FEC corrections of the first bit values to adjust the first, second, and third threshold values.

In some aspects of the method, using the FEC corrections of the first bit values to adjust the first, second, and third threshold values in Step 412 includes substeps. Step 412a tracks the number of corrections in the first bit when the first bit is determined to be a "0" value and the second and third bits are both "1" values. Step 412b tracks the number of corrections in the first bit when the first bit is determined to be a "1" value and the second and third bits are both "1" values. Step 412c adjusts the first threshold (V1) in response to corrections tracked when the second and third bits are both "1" values.

In some aspects, using the FEC corrections of the data stream to adjust the first, second, and third threshold values in Step 412 includes additional substeps. Step 412d tracks the number of corrections in the first bit when the first bit is determined to be a "0" value and the second and third bits are both "0" values. Step 412e tracks the number of corrections in the first bit when the first bit is determined to be a "1" value and the second and third bits are both "0" values. Step 412f adjusts the second threshold (V0) in response to corrections tracked when the second and third bits are both "0" values.

In some aspects, using the FEC corrections of the data stream to adjust the first, second, and third threshold values in Step 412 includes additional substeps. Step 412g tracks the number of corrections in the first bit when the first bit is determined to be a "0" value and only one of the second and third bits is a "1" value. Step 412h tracks the number of corrections in the first bit when the first bit is determined to be a "1" value and only one of the second and third bits is a "1" value. Step 412i adjusts the third threshold (Vopt) in response to corrections tracked when only one of the second or third bit values is a "1" value.

As an alternative to Steps 412g through 412i, Step 412j tracks the number of corrections in the first bit when the first bit is determined to be a "1" value (alternately a "0" value). Step 412k adjusts the third threshold (Vopt) in response to corrections tracked when the first bit is determined to be a "1" value (alternately a "0" value). Note, this process does not consider the preceding or subsequent bits.

More generally, using the FEC corrections of the first bit values to adjust the first, second, and third threshold values in Step 412 includes combining statistics of the number of corrections in the first bit when the first bit is determined to be a "0" value and:
  the second and third bits are both "0" values;
  the second bit is a "1" value and the third bit is a "0" value;
  the second bit value is a "0" and the third bit is a "1" value; or,
  the second and third bits are both "1" values; and,
Likewise, Step 412 combines statistics of the number of corrections in the first bit when the first bit is determined to be a "1" value and:
  the second and third bits are both "0" values;
  the second bit is a "1" value and the third bit is a "0" value;
  the second bit value is a "0" and the third bit is a "1" value; or,
  the second and third bits are both "1" values.

Alternately stated, Step 412 uses the eight patterns associated with PDF1 through PDF4 for the analysis of errors and the adjustment of the thresholds. In some aspects of the method, Step 412 additionally tracks the total number of first bit "0" value errors and tracks the total number of first bit "1" value errors. Then, thresholds can be determined in response to any one, or a combination of 10 different statistics.

FIG. 9 is a flowchart illustrating an alternate embodiment of Step 412 of FIG. 8a. Steps 400 through 408 are the same as in FIG. 8a and will not be repeated in the interest of brevity. The method generally corresponds to FIG. 6 and uses some alternate steps from those shown in FIGS. 8a and 8b. Step 414 tracks the data stream inputs when the second bit value equals the third bit value. Step 416 maintains long-term averages of the tracked data stream inputs. Step 418 adjusts the first and second thresholds in response to the long-term averages. In some aspects, Step 422 (not shown) decodes a plurality of channel equalized first bit values, when a corresponding plurality of input data streams are received.

In some aspects of the method, tracking the data stream inputs when the second bit value equals the third bit value in Step 414 includes substeps (not shown). Step 414a tracks the data stream inputs when the second and third bits both have "1" values. Step 414b tracks the data stream inputs when the second and third bits have "0" values.

In other aspects, maintaining long-term averages of the tracked data stream inputs in Step 416 includes substeps (not shown). Step 416a creates a first average of the data stream inputs when the second and third bits are both "1" values. Step 416c creates a second average of the data stream inputs when the second and third bits are both "0" values.

In some aspects, adjusting the first and second thresholds in response to the long-term averages in Step 418 includes substeps (not shown). Step 418a adjusts the first threshold (V1) in response to the first average. Step 418b adjusts the second threshold (V0) in response to the second average.

Some aspects of the invention include a further step. Step 420 adjusts the third threshold (Vopt) in response to adjusting the first (V1) and second (V0) thresholds in Step 418a and 418b, respectively. For example, the third threshold can be set to approximately midway between the first and second thresholds. Alternately, Step 420 includes substeps not shown. Step 420a measures the average data stream input voltage. That is, the voltage is measured constantly with regard to temporal analysis of the bit values. Step 420b sets the third threshold in response to the measured average.

A system and method have been provided for non-causally adjusting a serial data stream channel. Because inter-symbol dispersion is a non-causal impairment, the estimation algorithms are more effective when based upon iteratively collected data. The degree of iteration affects the performance of the circuit and is selected based upon the implementation tradeoffs. It is expected that those skilled in the art could implement the collection of such data. Although exemplary analysis algorithms using only the preceding and subsequent bits have been explicitly described, the present invention would obviously apply to algorithms using more than one preceding or subsequent bit value. Further, although the present invention has generally been described in the context of a single serial data input, it should be understood that the invention is equally applicable to a system that receives multiple serial lines in parallel, and decodes the channel equalized data as multi-level QAM or as a parallel data bus word. Other embodiments and variations of the invention will occur to those skilled in the art.

We claim:

1. A non-causal channel equalization communication system, the system comprising:
   a multi-threshold decision circuit having an input to accept a serial data stream, an input to accept threshold values, and outputs to provide bit estimates responsive to a plurality of voltage threshold levels; and,
   a non-causal circuit having inputs to accept bit estimates from the multi-threshold decision circuit, the non-causal circuit comparing a current bit estimate to bit value decisions made across a plurality of clock cycles, the non-causal circuit having an output to supply a bit value for the current bit estimate determined in response to the non-causal bit value comparisons.

2. The system of claim 1 wherein the non-causal circuit includes:
   a future decision circuit having inputs connected to the mutli-threshold circuit outputs, the future decision circuit having outputs to supply the current, first bit, estimate and a third bit value;
   a present decision circuit having inputs to accept the first bit estimate, the third bit value, and a second bit value, the present decision circuit comparing the first bit estimate to both the second bit value, received prior to the first bit estimate, and the third bit value, received subsequent to the first bit estimate, the present decision circuit having an output to supply the first bit value determined in response to comparing the first bit estimates to the second and third bit values; and,
   a past decision circuit having an input to accept the first bit value and an output to supply the second bit value.

3. The system of claim 2 wherein the multi-threshold circuit includes:
   a first comparator having an input to accept the serial data stream, an input establishing a first threshold (V1), and an output to supply a signal distinguishing when the serial data stream input has a high probability of being a "1" bit value;
   a second comparator having an input to accept the serial data stream, an input establishing a second threshold (V0), and an output to supply a signal distinguishing when the serial data stream input has a high probability of being a "0" bit value; and,
   a third comparator having an input to accept the serial data stream, an input establishing a third threshold (Vopt), and an output to provide a signal when the serial data stream input has an approximately equal probability of being a "0" value as a "1" value.

4. The system of claim 3 wherein the future decision circuit supplies a first bit estimate for a serial data stream input below the third threshold and above the second threshold;
   wherein the present decision circuit, in response, supplies:
   a first bit value of "1" if both the second and third bit value are "0" values;
   a first bit value of "0" if only one of the second and third bit values is a "0" value; and,
   a first bit value of "0" if both the second and third bit values are a "1".

5. The system of claim 4 wherein the future decision circuit supplies a first bit estimate for a serial data stream input above the third threshold and below the first threshold;
   wherein the present decision circuit, in response, supplies:
   a first bit value of "0" if both the second and third bit value are "1" values;
   a first bit value of "1" if only one of the second and third bit values is a "1" value; and,
   a first bit value of "1" if both the second and third bit values are a "0".

6. The system of claim 5 wherein the multi-threshold circuit accepts a serial data stream encoded with forward error correction (FEC); and,
   the system further comprising:
   a forward error correction (FEC) circuit having an input to receive first bit values from the non-causal circuit, the FEC circuit decoding the incoming data stream and correcting bit values in response to the decoding, the FEC circuit having an output to supply threshold values to the multi-threshold circuit in response to the FEC corrections and an output to supply a stream of corrected data bits.

7. The system of claim 6 wherein the FEC circuit includes a first threshold generator having an inputs to accept the first bit values from the non-causal circuit and the stream of corrected data bits, the first threshold generator:
   tracking the number of corrections in the first bit when the first bit is determined to be a "0" value and the second and third bits are both "1" values;
   tracking the number of corrections in the first bit when the first bit is determined to be a "1" value and the second and third bits are both "1" values; and,
   wherein the first threshold generator has an output to supply the first threshold (V1) in response to corrections tracked when the second and third bits are both "1" values.

8. The system of claim 7 wherein the FEC circuit includes a second threshold generator having inputs to accept the first bit values from the non-causal circuit and the stream of corrected data bits, the second threshold generator:
tracking the number of corrections in the first bit when the first bit is determined to be a "0" value and the second and third bits are both "0" values;
tracking the number of corrections in the first bit when the first bit is determined to be a "1" value and the second and third bits are both "0" values; and,
wherein the second threshold generator has an output to supply the second threshold (V0) in response to corrections tracked when the second and third bits are both "0" values.

9. The system of claim 7 wherein the FEC circuit includes a third threshold generator having inputs to accept the first bit values from the non-causal circuit and the stream of corrected data bits, the third threshold generator:
tracking the number of corrections in the first bit when the first bit is determined to be a "0" value and only one of the second and third bits is a "1" value; and,
wherein the third threshold generator has an output to supply the third threshold (Vopt) in response to corrections tracked in the first bit when one of the second or third bit values is a "1" value.

10. The system of claim 8 wherein the FEC circuit includes a third threshold generator having inputs to accept the first bit values from the non-causal circuit and the stream of corrected data bits, the third threshold generator tracking the number of corrections in the first bit when the first bit is determined to be a "1" value and adjusting the third threshold (Vopt) in response to corrections tracked when the first bit is determined to be a "1" value.

11. The system of claim 5 further comprising:
a first threshold generator having an input connected to the output of the non-causal circuit and an input to accept the serial data stream, the first threshold generator tracking the serial data stream inputs when the second and third bit values both equal "1" and maintaining a long-term average of the tracked serial data stream inputs, the first threshold generator having an output to supply the first threshold (V1) responsive to the long-term average.

12. The system of claim 11 further comprising:
a second threshold generator having an input connected to the output of the non-causal circuit and an input to accept the serial data stream input, the second threshold generator tracking the serial data stream inputs when the second and third bit values both equal "0" and maintaining a long-term average of the serial data stream inputs, the second threshold generator having an output to supply the second threshold (V0) responsive to the long-term average.

13. The system of claim 12 further comprising:
a third threshold generator having inputs to accept the first (V1) and second (V0) thresholds, and an output to supply the third threshold (Vopt) responsive to the first and second thresholds.

14. The system of claim 13 wherein the third threshold generator supplies the third threshold approximately midway between the first and second thresholds.

15. The system of claim 12 further comprising:
a third threshold generator having an input to accept the serial data stream input, the third threshold generator measuring the average voltage of the serial data stream and supplying the third threshold (Vopt) at an output in response to the measured average.

16. The system of claim 5 wherein the multi-threshold decision circuit accepts a serial data stream protocol selected from the group including non-return to zero (NRZ), return to zero (RTZ), binary symmetric, binary asymmetric, binary communication protocols where the clock is recovered from the data stream, and binary communication protocols where the clock is supplied as an independent signal.

17. The system of claim 5 further comprising:
a first plurality of multi-threshold decision circuits each accepting a serial data stream; and,
a first plurality of non-causal circuits, each having inputs to accept bit estimates from a corresponding multi-threshold decision circuit.

18. The system of claim 17 wherein the first plurality of multi-threshold circuits accept information modulated in a format selected from the group including first-level phase-shift keying and first-level quadrature amplitude modulation format.

19. The system of claim 18 wherein two multi-threshold circuits accept information modulated in a two-level quadrature amplitude modulation (4QAM) format.

20. The system of claim 17 further comprising:
a first multi-threshold decision circuit having an input to accept a first serial data stream, an input to accept threshold values for the first serial data stream, and outputs to provide bit estimates responsive to a plurality of voltage threshold levels; and,
a second multi-threshold decision circuit having an input to accept a second serial data stream, an input to accept threshold values for the second serial data stream, and outputs to provide bit estimates responsive to a plurality of voltage threshold levels;
a first non-causal circuit having inputs to accept bit estimates from the first multi-threshold decision circuit, the first non-causal circuit comparing a current first serial data stream bit estimate to bit value decisions made across a plurality of clock cycles, the first non-causal circuit having an output to supply a bit value for the current bit estimate determined in response to the non-causal bit value comparisons; and,
a second non-causal circuit having inputs to accept bit estimates from the second multi-threshold decision circuit, the second non-causal circuit comparing a current second serial data stream bit estimate to bit value decisions made across a plurality of clock cycles, the second non-causal circuit having an output to supply a bit value for the current bit estimate determined in response to the non-causal bit value comparisons.

21. The system of claim 6 wherein the FEC circuit includes first, second, and third threshold generators having inputs to accept the first bit values from the non-causal circuit and the stream of corrected data bits, the threshold generators tracking statistics of the number of corrections in the first bit when the first bit is determined to be a "0" value and:
the second and third bits are both "0" values;
the second bit is a "1" value and the third bit is a "0" value;
the second bit value is a "0" and the third bit is a "1" value; and,
the second and third bits are both "1" values;
the threshold generators tracking statistics of the number of corrections in the first bit when the first bit is determined to be a "1" value and:
the second and third bits are both "0" values;
the second bit is a "1" value and the third bit is a "0" value;
the second bit value is a "0" and the third bit is a "1" value; and,
the second and third bits are both "1" values; and, the first, second, and third threshold generator each having an output to supply the first threshold (V1), second threshold (V0), and third threshold (Vopt), respectively, in response to combinations of correction statistics.

22. The system of claim 21 wherein the threshold generators track statistics of the total number of first bit "0" value errors and the total number of first bit "1" value errors, and supply threshold outputs in response to the total number of "0" and "1" error statistics.

* * * * *